(12) United States Patent  (10) Patent No.: US 8,576,070 B2
Bourrieres et al.  (45) Date of Patent: Nov. 5, 2013

(54) METHOD AND DEVICE FOR VERIFICATION OF NON INTRUSION INTO A SYSTEM AND/OR NON-VIOLATION OF THE INTEGRITY OF AN OBJECT OR THE CONTENTS THEREOF

(76) Inventors: Francis Bourrieres, Montauban (FR); Clement Kaiser, Montauban (FR); Franck Bourrieres, Montauban (FR)

( * ) Notice: Subject to any disclaimer, the term of this patent is extended or adjusted under 35 U.S.C. 154(b) by 1622 days.

(21) Appl. No.: 11/718,205

(22) PCT Filed: Oct. 27, 2005

(86) PCT No.: PCT/FR2005/002706
§ 371 (c)(1),
(2), (4) Date: Apr. 27, 2007

(87) PCT Pub. No.: WO2006/048542
PCT Pub. Date: May 11, 2006

(65) Prior Publication Data
US 2008/0142671 A1  Jun. 19, 2008

(30) Foreign Application Priority Data
Nov. 4, 2004 (FR) .................................. 04 11734

(51) Int. Cl.
*G08B 1/08* (2006.01)
*G06F 11/30* (2006.01)

(52) U.S. Cl.
USPC ..................................... 340/539.26; 713/185

(58) Field of Classification Search
USPC ......................................... 235/487; 713/185
See application file for complete search history.

(56) References Cited

U.S. PATENT DOCUMENTS 3,077,689 A * 2/1963 Bundrick ......................... 40/308
3,769,932 A * 11/1973 Romito et al. ................. 116/207
(Continued)

FOREIGN PATENT DOCUMENTS

EP 1087334 3/2001
FR 2848698 6/2004
(Continued)

OTHER PUBLICATIONS

U.S. Appl. No. 10/182,967, filed Feb. 2, 2001, Bourrieres et al.

*Primary Examiner* — Brian Zimmerman
*Assistant Examiner* — Cal Eustaquio
(74) *Attorney, Agent, or Firm* — Vidas, Arrett & Steinkraus, P.A.

(57) ABSTRACT

The invention relates to a method and device for verification of non-violation of the integrity of a system or the identity of an object. An authentication seal is used, comprising a physical authenticator with bubbles (3) produced by a chaotic process on the production thereof, a characteristic of which is to be always unique and non-reproducible. A representation of said identifier with bubbles is stored in the form of an image and/or digitally in a database local or remote to the address (17), for authentication of the assignment of the identifier in situ or on the object for protection. Said authenticator is provided with a physical connection (16) which permits connection to the site or object for identification. Any attack on the integrity of the seal, whether on the authenticator and/or the connection, irreversibly alters the total seal such as to render the same un-reusable. Said authentication seal comprises a means for prevention of violation of the integrity of a site or the identity of an object and provides proof of an effective violation.

17 Claims, 8 Drawing Sheets

(56) References Cited

U.S. PATENT DOCUMENTS

| | | | |
|---|---|---|---|
| 4,574,189 A * | 3/1986 | Adams et al. | 235/30 R |
| 4,765,165 A * | 8/1988 | O'Gara | 70/417 |
| 5,512,738 A * | 4/1996 | Yuen | 235/382 |
| 6,045,050 A * | 4/2000 | Ippolito et al. | 235/492 |
| 6,990,761 B1 * | 1/2006 | Cox | 40/316 |
| 2002/0050516 A1 * | 5/2002 | Kitchen | 235/441 |
| 2003/0014647 A1 * | 1/2003 | Bourrieres et al. | 713/185 |
| 2004/0149823 A1 * | 8/2004 | Aptekar | 235/385 |
| 2005/0051549 A1 * | 3/2005 | Nelson | 220/23.83 |
| 2005/0103840 A1 * | 5/2005 | Boles | 235/385 |
| 2005/0242194 A1 * | 11/2005 | Jones et al. | 235/487 |
| 2006/0202009 A1 * | 9/2006 | Austin | 235/375 |

FOREIGN PATENT DOCUMENTS

| | | | |
|---|---|---|---|
| GB | 2304077 A * | 3/1997 | |
| WO | WO 01/11591 | 2/2001 | |
| WO | PCT FR/01/00322 | 8/2001 | |

* cited by examiner

METHOD AND DEVICE FOR VERIFICATION OF NON INTRUSION INTO A SYSTEM AND/OR NON-VIOLATION OF THE INTEGRITY OF AN OBJECT OR THE CONTENTS THEREOF

FIELD OF APPLICATION OF THE INVENTION

The present invention aims to provide a very high security method and device to prevent any violation of the integrity of a site, of an object or of a system, and consequently to verify that an attempt to violate or an effective violation in a site or a protected system or modification of the identity of an object of which it is necessary to preserve the integrity has not taken place or that an attempt to open or an effective opening of a system by an unauthorised person or substitution of an object with a copy or duplication of an original object has not taken place.

STATE OF THE ART

There are a multitude of methods for verifying the intrusion or the attempt to intrude into a system or a site for protection by unauthorised persons and to identify and authenticate objects as being originals. The most common modern means are:

- electronic alarms, these systems trigger an alarm when intrusion takes place by a person who does not stop the alarm beforehand using a secret code for example or an authorised biometric print.
- video surveillance systems allow to record or to control passage or access sites in real time,
- Cards (smart, magnetic, . . . ),
- secret codes or biometrics, allow to control access to the protected site or system.

All of these means are adapted to control the access and the comings and goings of human beings in private or public sites. As regards the securisation of access to systems or even the general prohibition of access in a site or in a system except by a sworn authority, so-called security seals are generally used, allowing to isolate and prohibit the opening of the system or of the site for protection. Seals are also used to guarantee the integrity or the authenticity of an object. These seals may take several forms according to the application. In theory the verification of the physical integrity of the seal allows to ensure there has been no violation of the system or of the object. The appellation "system" is taken in the broad sense, it may be for instance a set of elements associated between themselves or any package or packaging such as a bottle and the necessity for example to protect the integrity of the contents thereof, likewise it may be an information system processing sensitive data. The present invention is more particularly intended for these fields of application as will be described hereinafter.

The earliest seal is the wax seal, generally bearing the hallmark of the Authority. Metal or plastic seals also exist integrating an identifier in the form of a plastic cinch-up tie. These seals are not re-usable as their destruction is irremediable when the site or the system for protection is violated. There are also metal seals in the form of so-called "sealing wire" of which the two ends are swaged in a piece of soft metal, generally lead using a special sealer that relief-prints a hallmark onto said piece of lead, this is generally called a lead seal. Said type of seal is often used on water meters, gas meters and electricity meters, to prohibit access to the metering device whether the latter is mechanical or electronic. Likewise in the vast range of seal types we can include identification plates or supports of all natures that are often metal or plastic plates that are engraved or printed. These plates or supports generally identify an object, a complex system or a machine or a person by means of an identity card, this support bearing the hallmark of the Authority that issued it and that allows to authenticate it. The applications implementing identification plates or supports are numerous and varied, among the most common are: automotives that have both the identification plate of the manufacturer and the registration plates within the province of the administration; the identification and approval plates of machine tools; the plates of electric and electronic materials and machines, etc. . . . These identification plates are generally indexed in manufacturer or administration files or databases.

All of these types of seals or identification supports have two major drawbacks: the first is that they can very easily be identically reproduced with rough means the authenticating element or seal included, in fact large quantities of them are commonly available; the second is the substitution of an object or of a system for protection. For some of them, the connection between the seal or the support and the portions of which the separation or the opening is to be prohibited is inefficient and may easily be destroyed while maintaining the seal or the support intact. This may be an adhesive bond that may be dissolved by an appropriate chemical product or solvent allowing to recover the seal, to access the prohibited area and to reposition the seal in the same place as previously and thus to have accessed or modified data without anyone noticing. It is thus possible to substitute an original product with a copy and thus to pass a copy off as an original.

Likewise, to prohibit physical access to electronic systems containing confidential data, it is becoming common to use very specific and even highly secured holograms. Yet, the qualifier "highly secured" was most probably more appropriate in the past than it is nowadays as there are means to easily reproduce them identically with a level of quality that stands comparison with the original. Furthermore, the holograms are not individualised, i.e. all of those of one same series are identical and as a result, it is becoming easy for an unauthorised person to obtain these holograms, to open the case for protection by destroying the hologram and replacing it with a new one that is identical in every respect. In cases in which it is not possible to obtain the hologram, the counterfeiter can always remove it from the case without destroying it and put it back in the same way. Thus, one way on another, it is becoming extremely easy for a person determined to violate a system and to physically access confidential data, for example in an electronic case containing storage memories or to substitute one object for another. Generally, and regardless of the method used, the security seal must on the one hand prevent the risk of physical access of the container to the contents and on the other hand reveal this risk if it occurs in spite of all preventive means. The purpose of a safety seal is not to make attacks against a system or the access to a site or container impossible, however if it is well designed and well integrated into the product or the site for protection, it will dissuade the attacker eager not to leave traces. It is above all of a means of defense, said means being able to prove an attempt of violation of the physical integrity of the system or the object on which it is mounted. Depending on the applications, the so-called safety seal may take several forms. A seal is actually a physical means of establishing a union between itself and one or more elements that can be authenticated by an Authority that marks the seal with its hallmark (State hallmark for example).

By way of example:

a plastic or metal closure on mineral water, soda or alcohol bottles of which the first opening results in the cutting of the lower portion of the closure attached to the bottle. This portion constitutes a seal between the closure and the bottle and enables the consumer to verify that the bottle has not been opened.

plastic or metal bottle capsules that need to be totally or partially destroyed in order to open the bottle, "destructible" labels making it possible to connect two elements between themselves, these labels are often used to prove the opening of electronic equipment, destructible labels proving the opening of a package, of an envelope, . . .

likewise, a national identity card must constitute a seal between the citizen who owns it and the State that issued it to him, a bank card must constitute a seal between the customer who owns it, of which he knows the code recorded in the memory and the bank that grants a right to pay or to withdraw money.

a health card must constitute a seal between the patient who owns it, the health agency that allocated it by name with rights associated with the patient.

In all of these applications, the problem is precisely the possibility to reproduce these official seals or documents identically, and consequently the possibility to fraudulently access the physical contents of the package or rights unauthorized for the holders of false documents. Indeed, the authentication elements of such documents are either complex prints, or holograms, or filigrees or invisible ink, but all of these techniques result from common and mastered industrial processes that are thus easily forged. With regard to microchips taken even in their most secured forms including a cryptoprocessor, the latter only ensure the connection between the person and the issuing organization or Authority and prove the authenticity of neither the support, nor the contents of the memory because it only constitutes logic which will sooner or later be accessible by counterfeiters using computing power and who will be able to uncover the secrecies shared and thus produce "real fake" identity cards, health cards, bank cards and so on . . . .

Patent FR2848698 of the same applicant and inventor, relates to a method of identification and authentication of an object or a living being without a specific reader. In this document, it is recommended to attach an identifier difficult or impossible to reproduce to the object or the living being for identification or authentication. As can be appreciated, this document does not refer to a system of verification of non-intrusion into a system or a site for protection or non-violation of the integrity of an object which is precisely the object of the present invention. The method described in document FR2848698 does not in any case allow to guarantee the non-opening of a system or a site for protection. Indeed, affixing an identifier on an object does not prevent having access to the object, modifying it, analysing it, . . . without this being visible. At worst, it is even possible to remove the authenticator from an object without destroying it and to affix it on another object.

Document WO 01/11591 describes a device that makes it possible to identify objects. This identifier has the characteristic of comprising a matrix of lenses that generates a three-dimensional optical effect, which does not mean it is not reproducible. The information disclosed in this document differs completely from the present invention primarily in that:

following the example of patent FR 2848698, this identifier does not allow to guarantee the proof of the opening of or the intrusion into the object or the site for protection.

The identifier described in this document is reproducible ad infinitum as it is based on a manufacturing process admittedly complex but mastered. Consequently the uniqueness of this identifier is not guaranteed.

the identifier is not associated with a database.

Document EP1087334 describes a sealing system using a transponder which makes it possible to contain an electronic identification code that can be interrogated remotely. There is nothing unique about this type of transponder as it is possible for a person or an organisation with production means to produce several of them with the same number. Consequently, it is quite possible to open the device described, to access its contents and to reconstitute a set of two capsules identical to the first responses with a transponder giving the same response as the first. In fact, the flaw in this type of device lies in the entire capsule and transponder supply chain, if an ill-intentioned person or organisation can misappropriate parts, he/it would also be able to reconstitute the seal such that it is identical to the first. In the present invention as described hereinafter, the method of non-intrusion is based on a unique authenticator that cannot be reproduced identically and that is recorded in a database, consequently, even if a person manages to steal identifiers, the latter would be of no use as they would not be recorded in the database.

DESCRIPTION OF THE INVENTION

The invention aims to provide a global solution to the two difficulties that arise when using seals and identification plates or supports i.e.: making the seals or supports non-interchangeable between themselves and making the seal physically interdependent of the system or the site or the object for protection such that if an intrusion or simply an intrusion or substitution attempt occurs, either the seal, or the connection that connects it to the system, or both are irremediably destroyed or marked in a visible manner by a controller. As such, the method according to the invention plays a preventive role as it makes it possible to verify the non-intrusion into a system or a site for protection in an unquestionable way and thus to prevent any act of malicious intent.

According to a first particularly innovative and inventive feature, a unique physical authenticator that cannot be reproduced identically is used to ensure its non-interchangeability and of which a representation is stored in a local or remote database, To ensure the non-reproducibility of the physical authenticator a volumic identifier that is the result of a chaotic process impossible to control by man is used. By way of example this chaotic process may be the formation of bubbles upon the hardening of the material constituting said authenticator. Thus, contrary to prior devices of the art which are the result of a manufacturing process thoroughly mastered by man and thus reproducible by another person in possession of similar tools, each authenticator used in the present invention is unique and impossible to reproduce by man as it is the result of a process uncontrolled by the latter. This feature makes it possible to permanently eliminate the possibility of anyone obtaining authenticators or seals identical to the originals. In this manner, the only remaining means of accessing the inside of the system or site for protection is to try to recover said original authenticator without destroying it. In order to solve this second problem and according to a complementary feature the authenticator is associated by a physical connection with the system or the site for protection or to the object such that any attempt to open the system or the site for protection visibly modifies or destroys the unique physical authenticator that is original and non-reproducible by making it unusable and/or visibly modifies or destroys the connection associating said physical authenticator with the system or with the site for protection or with the object and such that the verification of the integrity of the physical authenticator and of its correspondence to its representation stored in the database guarantees the fact that intrusion into the system or the site for protection or substitution of the object has not taken place. In practise several solutions exist with regard to the choice of a tamper-proof authenticator as well as to the choice of a physical connection to the system for protection, this association being implemented within the framework of the present invention.

According to a further feature, as a unique physical authenticator that cannot be reproduced identically i.e. that is impossible or extremely difficult to clone, a transparent material with heterogeneities dispersed at random in the volume may be used. Said visibly distinguishable heterogeneities are captured for example in the form of a photograph and one or several representations characterizing this shape of identifier are stored in a memory or a database either in the form of a two-dimensional image, or digitally designed using remarkable elements, of position, of dimension etc. of the heterogeneities embedded in the volume, the two forms of image and digital representation being able to coexist. Likewise, it is possible to integrate magnetic particles into this form of identification permitting encoding in another manner.

According to another feature and a preferred method, a transparent volumic authenticator made of glass ceramic, plastic or polymers containing visible bubbles of which the number, the shape and the arrangement result from chaotic self-generation that cannot be controlled by man is used. Said type of authenticator is particularly interesting as it is always unique and cannot be cloned by man. Patent PCT FR/01/00322 of the same applicant and the same inventors suggests this type of authenticator with bubbles with a suitable reading system. In the case of the present invention it is a question of using this authenticator with bubbles in a particular method of which the purpose or aim is to block or to prohibit access to systems or sites or to verify the integrity or the identity with information associated with an original object. In the same way as previously, a representation in image and/or digital form is stored in a database in order to be able to verify the integrity of said original authenticator. Another type of authenticator can be constituted using the physical connection or the object as such by indexing a surface of the matter constituting an original aspect and by encoding or by encrypting this using an algorithm. Said signature is stored in the same way in a local or remote database or may be printed next to this authenticating portion. To all of the cited tamper-proof authenticators, others may certainly be added without departing from the scope of the invention. In all instances, it is necessary to store a representation of the characteristic elements of the chosen authenticator in a database or to print a signature specific to the authenticator locally and according to a chosen algorithm.

According to a further feature, the memory and/or the database in which a representation of the authenticator is stored, is/are physically located in the system or/and the site for protection or/and on the support itself but the contents thereof can be read from the outside by an authorized person. This representation of the authenticator constitutes a key providing access to the physical system and/or logic information.

According to a further feature the representation of the authenticator in image and/or digital form may be consulted via an Internet-type telecommunication network.

According to a further feature, the contents stored in image form and/or digitally may be consulted by a controller or authorised agent in several ways. A first way consists in visually comparing the representation in the form of an image stored in the local and/or remote database with the physical authenticator by analysing the similarity of the bubble or heterogeneity positions. There are several means of viewing the image: either directly on a screen integrated into the system or site for protection, or on a separate or additional screen (mobile telephone with Internet access), or once printed on paper using an integrated printer or using a printer separate to the system or site for protection. In cases in which the database is remote rather than local, a call directing code constituting the identifier of the authenticator in the remote database is used, the call directing code may be digital, alphanumeric, a bar-code, a magnetic track, a chip, etc.

It is evident that the local or remote database is secured or protected against any attempts to modify it or to replace it with other information.

According to another feature the method for verification of non-intrusion into a system or a site for protection or for non-violation of the integrity of an object according to the invention is carried out by comparing the authenticator automatically, using a suitable reader, with the digital representation thereof stored in a local or remote database.

According to a further feature of the method according to the invention, the unique and non-cloneable and therefore tamper-proof authenticator is associated with the system or the site for protection by a physical connection such that any attempt to open visibly modifies or destroys said authenticator making it unusable and/or visibly modifies or destroys the connection associating the authenticator with the system or with the site for protection.

According to the invention, this physical connection is an extremely important element as with the authenticator becoming unattackable owing to the intrinsic features of non-reproducibility thereof, forgers will try to attack this connection, hence and according to a feature of the method, the physical connection associating the physical authenticator with the system or with the site or with the object for protection and for unquestionable identification is a wire integrated in a permanent and irreversible manner into both the authenticator and the element for protection.

According to one feature this physical connection is partially integrated into the authenticator with bubbles on the production thereof. According to a preferred and particularly inventive alternative, one of the ends of a metal or non-metal wire is embedded in a polymer or transparent material sandwiched between two sheets of which at least one is transparent. Upon solidification, said polymer or transparent material is able to generate chaotically distributed bubbles, said bubbles being of various shapes and dimensions and being random in number. The sandwich sheets and the material forming the bubbles are selected and surface-treated such that after solidification they form a complex which is inseparable unless said complex is broken thereby making the identifier unusable in this case. The free second end of the wire of which one of the ends is inserted into the complex in a permanent manner is then inserted into holes arranged between for example a door and its frame or a lid and its support, etc., the opening of which is to be prohibited. The second end is then sandwiched between two portions of the sheets trapping the material with bubbles, on the understanding that these portions are adjacent to the material containing the bubbles but along the extension of and with the same sheets. These two sheets and the second end of the wire placed inside are then assembled in a permanent manner using any suitable means. By way of example, ultrasonic welding on polyester sheets gives excellent results. Thus the assembly of the two ends of wire, the first trapped in the material with bubbles, the second sandwiched and ultrasonically welded between the two sheets renders the connection irremediably associated with the authenticator and with the system for protection. Any intrusion attempt will modify or break either the connection itself, or the authenticator, making it possible to provide proof of an effective violation or attempted violation of system opening. According to a further alternative, the two ends can be ultrasonically welded. This form of seal may also be suitable to be affixed to any object of which the original integrity needs to be maintained.

According to a further feature of the method, the physical connection associating the physical authenticator with the system or with the site or with the object for protection is a transparent polymer uniting the authenticator and the element for protection in a permanent and irreversible manner. By way of example one embodiment of the invention consists in connecting the lid or the door to the support or to the site of which the opening is to be prohibited by a mechanical system or again placing an identification plate on the object and then concealing the mechanical system with an identifier of the type with bubbles, the whole being integrated into a transparent polymer of the polyester or silicone resin type forming a lock blocking access to the mechanical system on the one hand and/or prohibiting recovery of the bubble code on the other hand. The general object of the invention is to protect the integrity of a system, of an object or of a site by dissuading any violation attempt as if the latter is still possible, the forger or the counterfeiter knows that he will inevitably be detected.

Regardless of the implementation thereof, the volumic physical authenticator and the physical connection together constitute a very high security authentication device or seal intended to prove the non-violation of a system or of a site and/or the identity of an object thus perfectly illustrating the principle of defense in depth. Thus, according to a further feature of the invention this authentication seal is characterised in that it constitutes a unique and non-reproducible volumic physical authenticator of which a representation is stored in a database and of a physical connection integrated into said authenticator which makes it possible to associate it with the system for protection or for identification and that an intrusion into the system or the site for protection or on the seal itself intended to prove the identity of an object irreversibly alters said authentication seal.

As evoked in the problems of proof of authenticity of official documents intrinsically constituting a seal between the customer or the citizen or the patient who owns the document and the issuing organization of said document, the present innovation provides a suitable solution for incontrovertible proof. In applications such as national identity cards, passports, health cards, bank cards, etc it is necessary on the one hand to prove the authenticity of the document issued by the authority and on the other hand to prove the assignment of this unique document to a well identified person and not to another. An authenticator with bubbles such as described previously internally laminated in the card body on the production thereof makes it possible to render it always unique and totally non-reproducible. Such an authenticator with bubbles which is a three-dimensional chaos of absence of material in the material constitutes a physical public key as may be accessed and viewed by everyone in the same way. The reading of such a physical public key can be made in an infinity of manners constituting as many private logical keys according to the chosen algorithms. In these conditions, this physical public key constitutes a generator of private logical keys. This public physical key is integrated into an official document and is indexed in the embedded memory or cryptomemory and/or in the issuing organization database. Having become a key accessible only for reading and never for writing, this physical authenticator will fulfill several functions simultaneously, namely:

it allows both the visual and electronic authentication of each physical support guaranteeing and proving the legal and individual existence of each document issued by the authority, it allows to verify and prove the assignment of the owned document to the sole holder of rights, used as a generator of logical keys, it allows to guarantee the integrity of the contents of the embedded memory.

According to a further feature, an RFID (radio frequency identification) can be associated with and physically integrated into the authenticator with bubbles according to the present invention to form a high security seal. In this case, the only purpose of the RFID would be to identify and verify the coherence between a logical signature extracted from the bubble code and that stored in the RFID memory. This application proves to be of much interest to secure an entire traceability chain by sampling to authenticate certain objects among batches of identical objects. Concretely the RFID antenna or the silicon chip can be partially or wholly embedded in the material constituting the authenticator with bubbles on the production thereof.

Other features are revealed hereinafter by way of explanation of the various figures.

Figure 1:
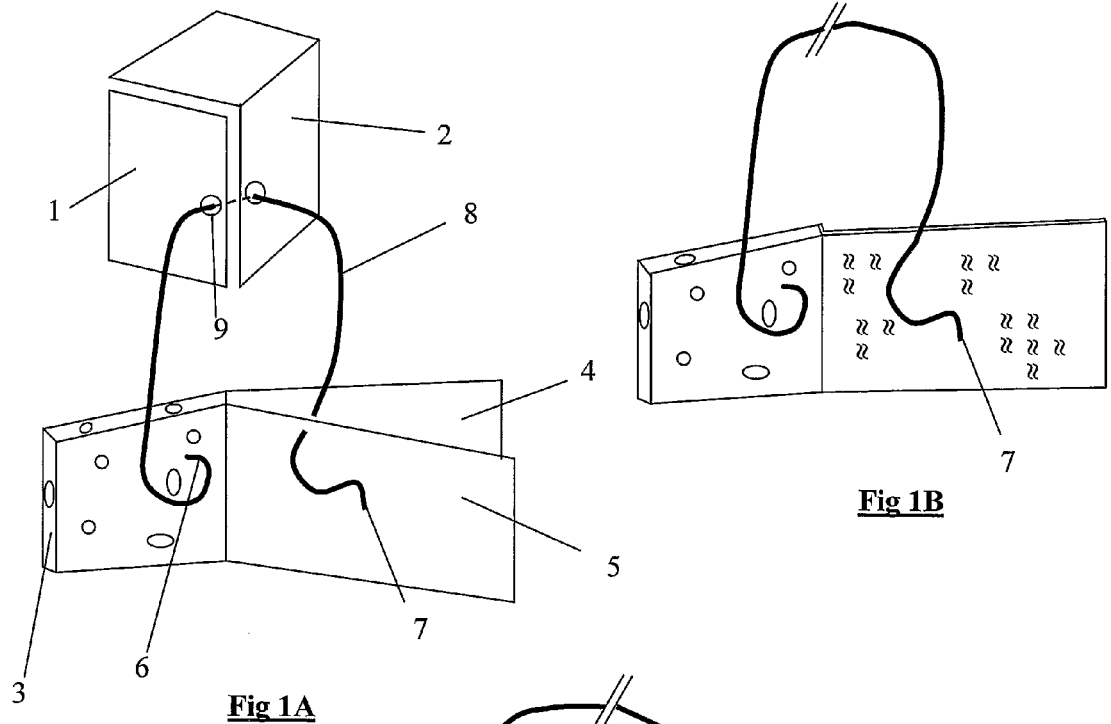
FIG. 1 shows a lid to prohibit opening of a support, with 1A showing a wire connected to the lid and support and trapped by an identifier, 1B showing an end of the wire held between sheets and 1C showing both wire ends between sheets.
Figure 1:
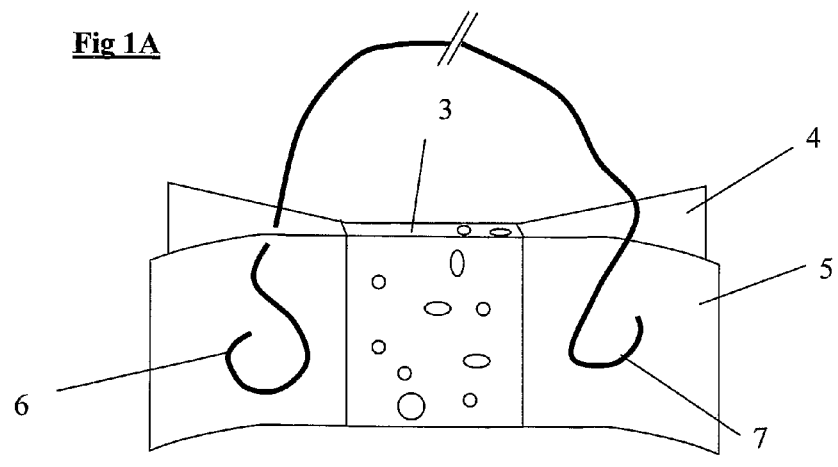

FIG. 1 illustrates a lid (1) of which it is necessary to prohibit the opening of the support (2) or to be able to prove the opening or attempted opening is shown. One of the ends (6) of a wire (8) is integrated beforehand into the authenticator with bubbles (3) on the production thereof. This authenticator with bubbles (3) is sandwiched between two sheets (4) and (5) of which at least one of the two is transparent and the other is preferably reflective. After passage of the wire through the openings (9) of the lid (1) and of the support (2), the other end of the wire (7) is positioned between the free portions non-occupied by the identifier with bubbles as illustrated in 1A. Thereafter and as illustrated in 1B, the end (7) is welded between the two sheets (4) and (5) by ultrasound or gluing or heat welding or any other suitable means In these conditions, any intrusion attempt by removal of the wire trapped between the two welded sheets will result in either rupture of the wire, or destruction of one or both of the welded sheets rendering same seal unusable as the offence is visible. If substitution with another seal takes place, the latter will necessarily have another authenticator inevitably different as they are all unique as has been explained. Thus when checked by an authorized person, the latter will be able to verify whether or not the authenticator corresponds to the image signature or the digital signature stored in the local and/or remote database.

Figure 2:
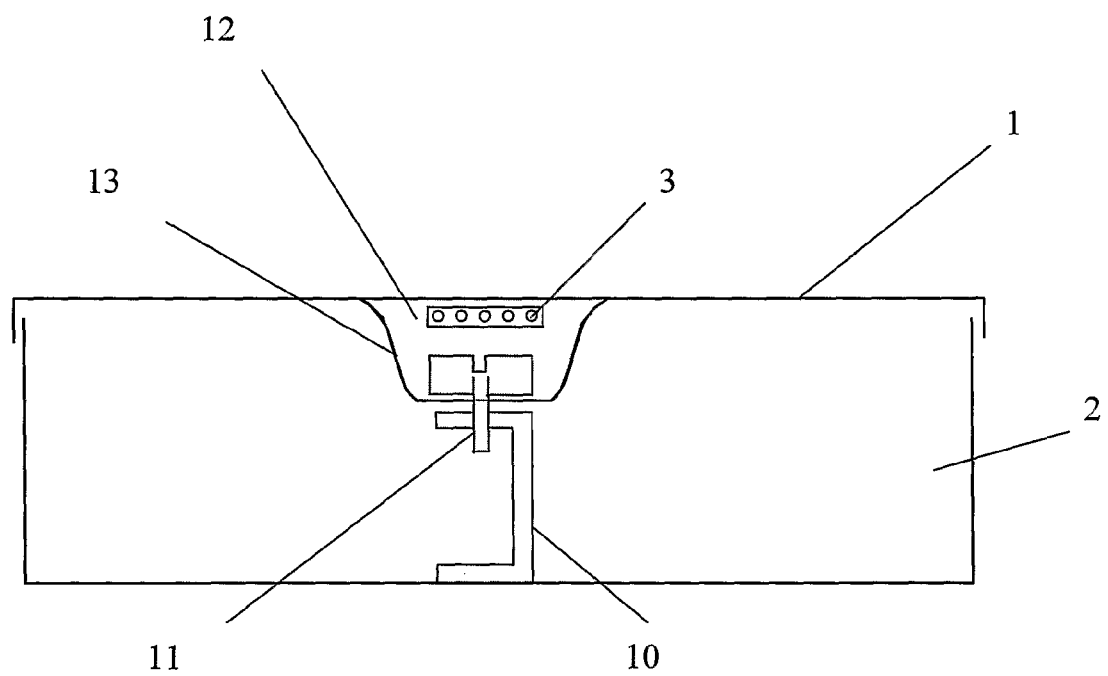
FIG. 2 shows a lid fitted to a support with a screw with an authenticator in a tank on the lid.

FIG. 2 illustrates a lid (1) of which it is necessary to prohibit the opening of the support (2) or to be able to notice the opening or attempted opening. In this example the lid (1) is fitted to the support (2) by means of a screw (11) which screws onto a lug (10) integrally formed with the support (2). A transparent resin (12) is then cast into the tank (13) built into the lid (1), this resin constitutes the physical connection between the authenticator and the object for protection. A unique and non-reproducible volumic identifier of the type with bubbles (3) is incorporated into the transparent resin (12) before the hardening thereof. The authenticator (3) will have been subjected to preparation of the surface beforehand permitting very strong adherence of the resin (12) to the external faces thereof in order to prohibit any scraping of the resin (12) which would give access to said authenticator (3) so as to recover it intact. In these conditions, we appreciate that it is extremely difficult or impossible to access the screw (11) which permits the opening of the lid without damaging the unique authenticator (3). In order to simulate a non-opening, the forger will try to cast a new resin (12) with a new authenticator (3) so as order to give an appearance of non-violation, yet this will inevitably be different from the previous which can be checked at any time by interrogation of the database.

Figure 3A:
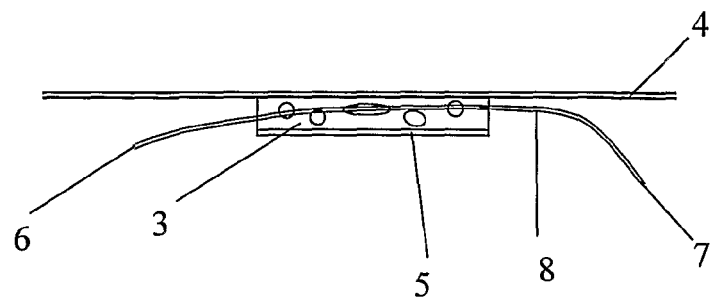
FIG. 3 shows an authenticator in 3A sandwiched between lower and upper sheets with a wire through an authenticator and a side view and top view in 3B attached to a lid and support.
Figure 3B:
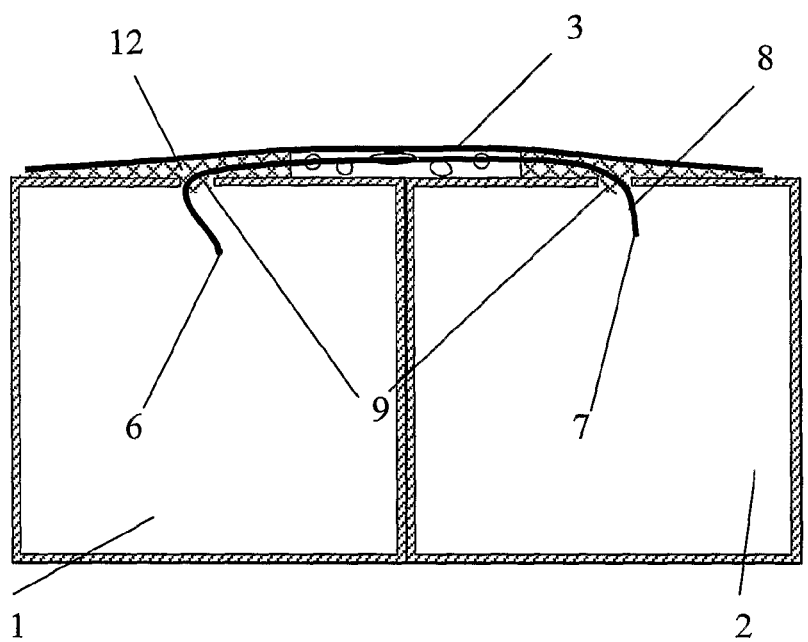
Figure 3B:
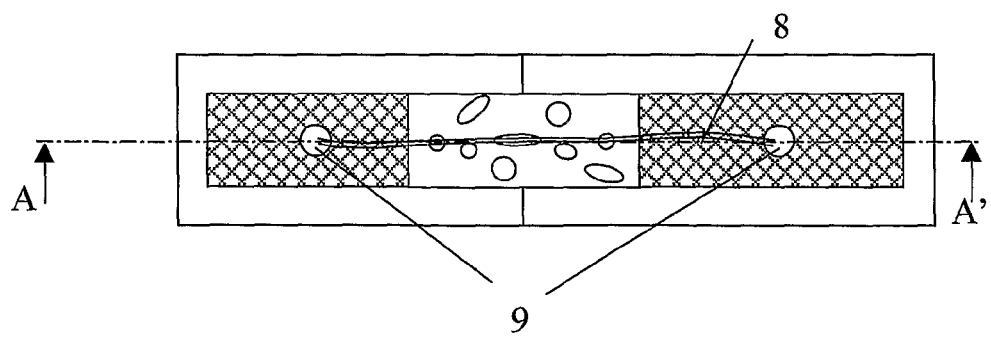

FIG. 3 illustrates a further embodiment of a seal and integration into the system or into the site or if necessary with the object for protection according to the invention. FIG. 3A illustrates the complex forming the seal in which are associated:
  A unique and non-clonable authenticator (3) sandwiched between a lower reflecting metal plated polyester sheet (5) and an upper much longer transparent sheet (4),
  A wire (8) passing through the identifier (3) positioned and integrated upon production of the complex forming the seal.

This constituted assembly is inseparable after realization, the portions being adhered by any suitable means. Two holes (9) are provided in the two elements to be joined together (1) and (2). In this embodiment, the method of integration into the system for protection is as follows: an adherence treatment is carried out beforehand on the portions of the sheets (4) and (5) that will come into contact with the system as well as locally on the elements to be joined together (1) and (2); a standard glue-type bonding agent with two constituents or transparent silicon glue (12) is applied to the entire surface locally accommodating the seal; the seal is then applied by positioning the two ends (6) and (7) of the wire (8) in the holes (9); the assembly is then pressed. Thus the connection wire (8) constituting the connection between the authenticator (3) and the elements (1) and (2) of the system for protection is inviolable without destruction thereof. As in all of the previous instances, either the intrusion or intrusion attempt is visible as the integrity of the connection or of the unique authenticator is violated, or there is nothing apparently visible in which case it is necessary to verify whether the physical authenticator (3) and its representation in the local or remote database correspond.

Figure 4:
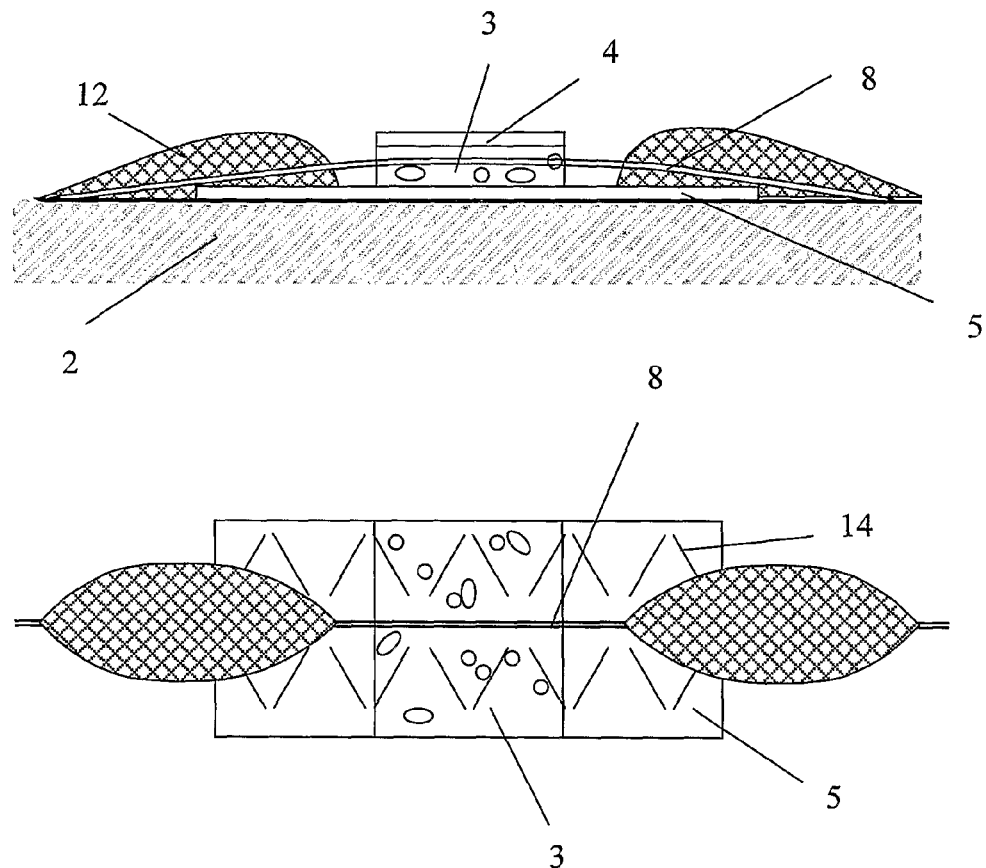
FIG. 4 shows a side and top view of a volumic authenticator between upper and lower sheets.

FIG. 4 illustrates a further embodiment of a seal and integration into the system or into the site or if necessary with the object for protection according to the invention. In this version the volumic authenticator (3), with bubbles for example, is sandwiched between a transparent upper sheet (4) and a reflective lower sheet (5). A wire (8) of a length greater than the seal is integrated inside the authenticator (3) on the production thereof. Microcut areas are provided on the lower sheet (5). These microcuts form an integral part of the physical connection and along with the crossing wire (8) contribute to the embrittlement of this connection when the seal is associated with the system or the site or the object for protection. In the implementation thereof, said seal is positioned by gluing for example onto the support of which the integrity needs to be protected, the wire (8) is then embedded in a transparent resin. Violation of the seal in attempt to recover it integrally without visible defects with a view to repositioning it is impossible as the microcuts (14) and the wire (8) jointly contribute to the embrittlement of the seal. The microcuts (14) and the wire (8) can be added to the images and/or digital signatures stored in the database in addition to the bubbles or other elements characterizing the authenticator.

Figure 5:
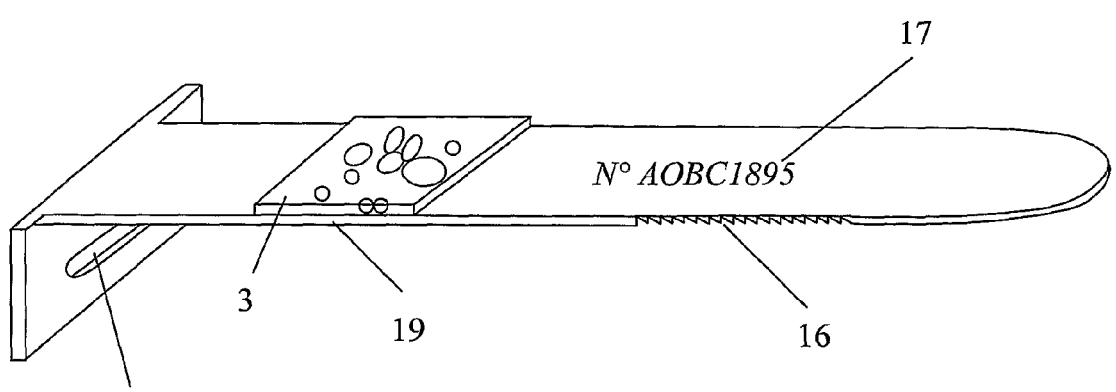
FIG. 5 is a perspective view of a volumic authenticator integrated into an attachment tie.

FIG. 5 illustrates a further embodiment of a seal and the possibility to integrate into the system or into the site or if necessary into the object for protection according to the invention. In this version the volumic authenticator (3), with bubbles for example is directly integrated on production into a self-gripping attachment tie impossible to re-use as it is of the cinch-up and irreversible type. This principle of non-reverse tooth tie has been widely used for a very long time. In the case of the present invention the support (19) is made of reflective stainless steel for example, the assembly is a one-piece unit. An authenticator with bubbles (3) is positioned in a tamper-resistant manner by gluing or direct adherence of the material used during bubble generation to the support (19). Upon assembly onto the system or the site for protection the tie is inserted into holes provided on the one or several portions to be joined together and protected and the toothed end (16) is subsequently inserted into the (15) non-reverse passage. In these conditions, the authenticator (3) and the physical connection permitting connection to the object are inseparable without destruction thereof. In this example an alphanumeric code is engraved on the collar, it constitutes the call identifier in the database in order to verify that it is indeed the correct bubble code and to acknowledge the authentic object to which it is attached and information associated therewith.

Figure 6:
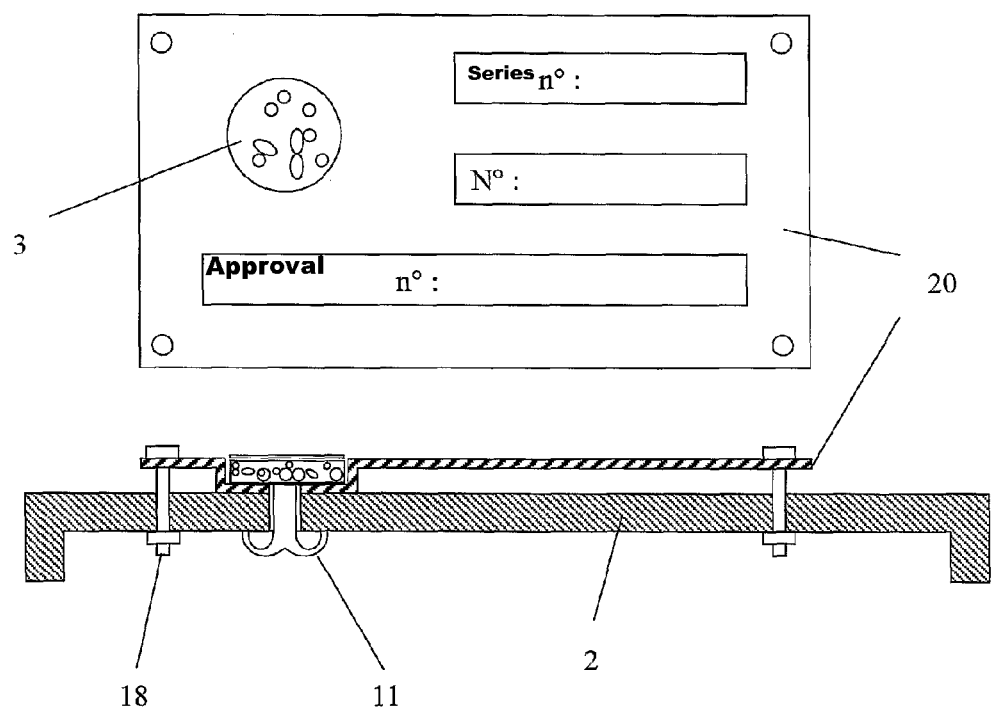
FIG. 6 is a top and side view of a volumic authenticator incorporated into a metal nameplate.

FIG. 6 illustrates a further embodiment of a seal or identification plate according to the invention and integration thereof into the system or into the site or if necessary into the object for protection or identification. In this version the volumic authenticator (3), with bubbles for example is directly integrated upon production into a metal nameplate (5) as is found on all types of apparatus or machines generally carrying the serial number, the type, the approval number, the date and the country of production, the name of the manufacturer etc. The authenticator (3) is adhered in a non-dismountable manner within a space provided for this purpose on the plate (20) which itself is mounted on the system (2) for protection and/or for identification by means of rivets visible and accessible from the outside (18) and of a blind rivet (11) accessible only from the inside but at the price of destruction thereof or even of the authenticator with bubbles (3) if dismounted. Naturally any other rivet or blind rivet system rendering the attachment irreversible may be suitable. As in the other scenarios an access number of any known type such as digital, alphanumeric, RFID, bar-code, magnetic etc., can be associated to access the database and thus verify the authenticity of the seal or of the identification plate in comparison to the object on which it is positioned.

Figure 7:
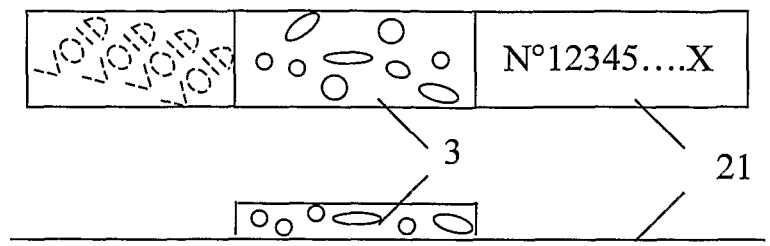
FIG. 7 is a top and side view of an adhesive label with a volumic authenticator.

In FIG. 7 another form of the security seal is shown according to the present invention in the form of an adhesive label, of which the base (21) is partially destructible upon pulling. This form of seal associates an adhesive base (21) referred to as "VOID" or "Temper evident" with an authenticator with bubbles (3) integrated in a non-dismountable manner into said base (21). This type of seal is particularly suitable for sealing packages. Indeed, to do so the label simply needs to be applied astride an opening of the package.

Figure 8:
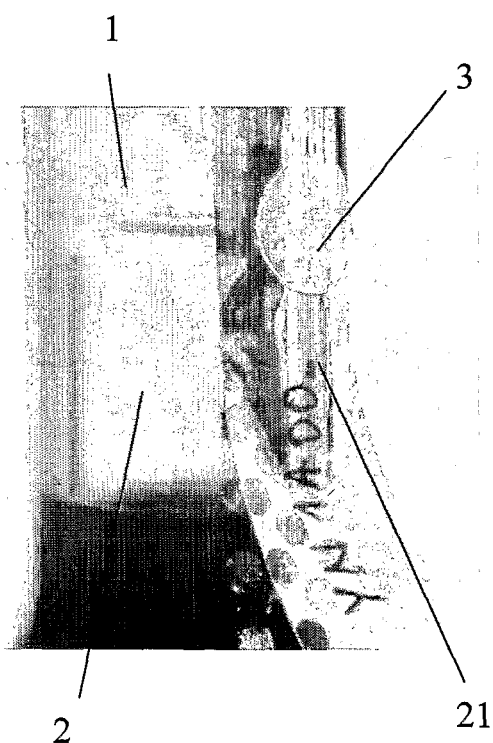
FIG. 8 shows a security seal with bubbles on a label applied to a capsule of a bottle.

In FIG. 8 a security seal with bubbles in the form of a label of the type described in FIG. 7 is shown, applied to the capsule (1) of a bottle (2) so as to authenticate not only the container but also to guarantee the integrity of the contents. In this case precisely, access to the contents will inevitably be detected either by the deterioration of the label which is placed astride the bottle and the capsule, or by the replacement of a new seal with bubbles which will not be recorded in the database, or by destruction of the capsule.

Figure 9A:
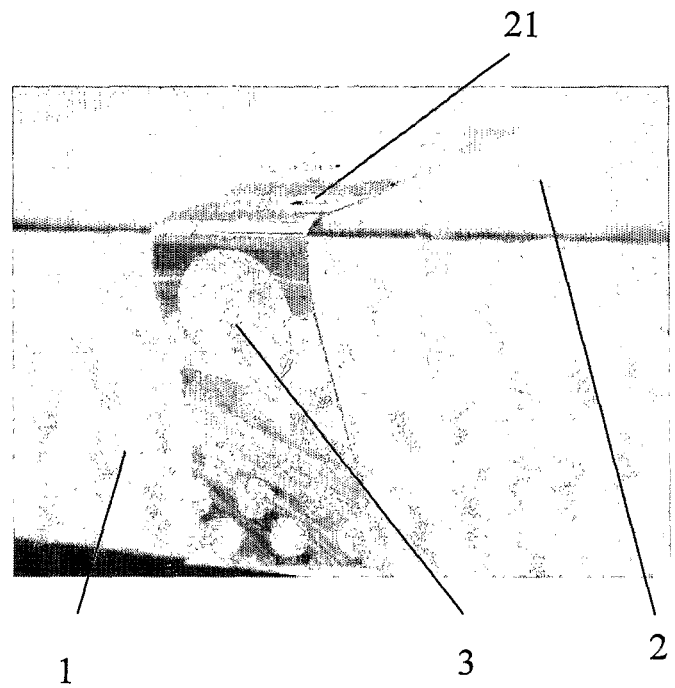
FIG. 9A shows a security seal with bubbles label on a closure of a casing.

In FIG. 9A, a security seal with bubbles in the form of a label of the type described in FIG. 7 is shown, applied to the closure (1) of a casing (2) so as to authenticate not only the container but also to guarantee the integrity of the contents. In this case precisely, access to the contents will inevitably be detected either by the deterioration of the label which is placed on the opening (1) of the casing (2), or by the replacement of a new seal with bubbles which will not be recorded in the database.

Figure 9B:
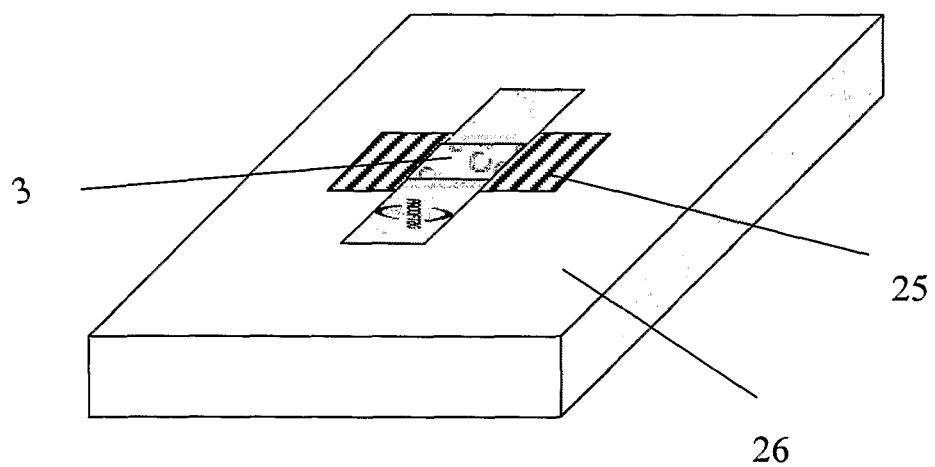
FIG. 9B shows a label as a seal of a primary package within a secondary package.

In FIG. 9B, an authenticator with bubbles (3) in the form of a label of the type described in FIG. 7 is shown, applied to the seal of a primary package (25) inside a secondary package (26). To do so, an opening in secondary package (26) allows to place the seal (3) with bubbles on a destructible adhesive label, on both the secondary package (26) and the primary package (25). If the secondary package (26) may be opened without deteriorating the seal (3) any extraction of the primary package (25) or of the contents thereof causes the destruction of the seal or/and of primary package (25).

Figure 10:
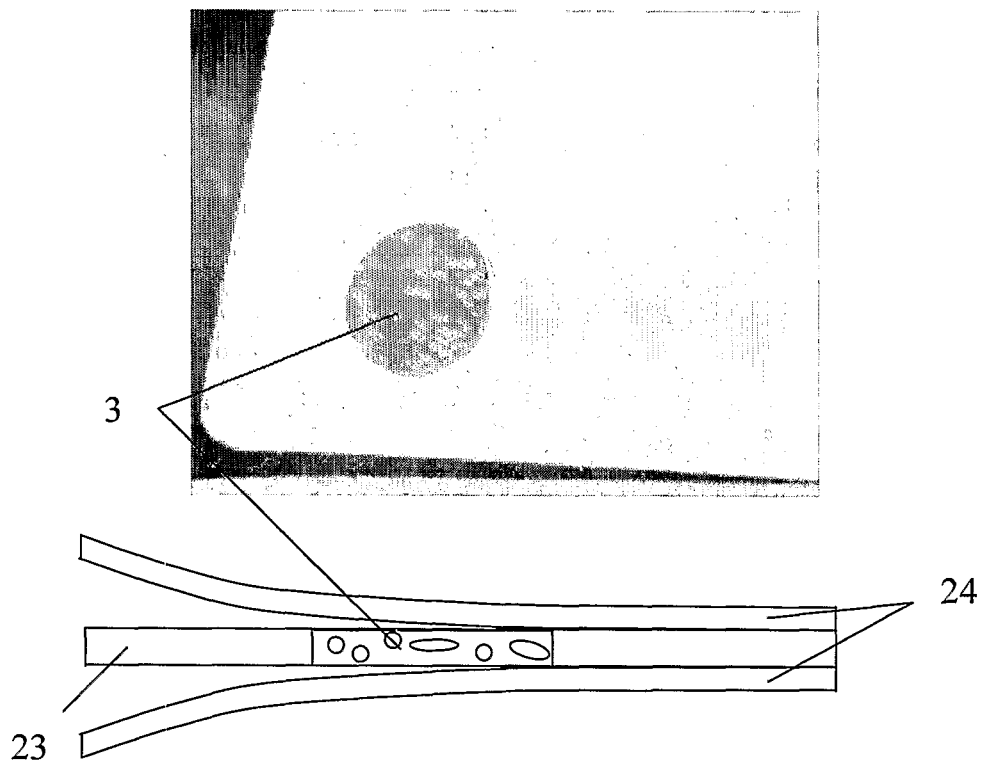
FIG. 10 is a top and side view of a public physical key laminated in a card body.

In FIG. 10, an authenticator with bubbles (3) comprising a public physical key laminated in a card body (23) on the production thereof between two protective sheets (24) forming a sandwich is shown. Such a support integrating a unique and non-reproducible authenticator constitutes an intrinsically secured unit permitting access either to allocated rights stored in a database, or to confidential data. This right may be of any nature, it may be the physical access of a person to buildings, the right to withdraw money or to make payments for a bank card, proof of identity and citizenship for an identity card or a travel right for a passport. In the present case, the authenticator (3) may be associated with a memory or a cryptoprocessor. This memory may be magnetic, optical, electronic or may be printed one or two-dimensionally in the form of a barcode.

In the present case, the protective sheets (24) constitute the physical connection associating the physical authenticator (3) with the card body (23). It is evident that several embodiments exist without departing from the present invention. By way of example, it would be possible to provide a spotfacing in the card body (23), to insert the authenticator therein and to apply only one protective sheet (24) to the card body and to the authenticator to physically connect the authenticator (3) to the card body (23). Thus the authenticator (3) may be directly integrated by lamination into a card body under one or between two sheets (24) forming a sandwich.

Figure 11:
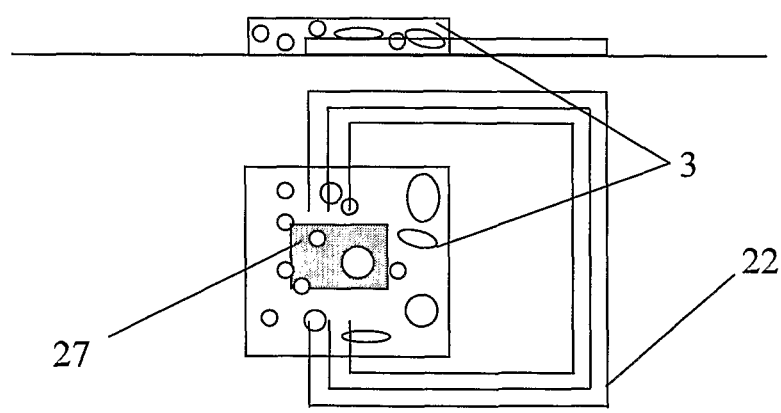
FIG. 11 is a side and top view of an authenticator with bubbles into which an RFID chip is inserted.

In FIG. 11, an authenticator with bubbles (3) into which an RFID (22) (radio frequency identification) is partially inserted. In this case, by way of a non-limitative example, an image or a logical signature extracted authenticator with bubbles (3) is encrypted and stored in the memory of RFID (27) thus permitting, not only identification conferred by the RFID, but very high security authentication conferred by the bubble code (3) during a check "in situ".

According to a further feature of the authentication method and seal, it is particularly inventive to associate at least two authenticators of the codes with bubbles type between themselves by means of at least two seals each of which are affixed to at least two physically separable portions of the system or the site or the object. By way of example it is thus possible to associate an object with its own seal or identification plate with its purchase invoice comprising its own seal in the same database, the same call number or address in the database then allows to verify the association between the one and the other, among others this feature allows to combat theft and concealment. Among many potential applications of this feature there is the association of a work of art or antique or luxury product with its certificate of authenticity; the association of a certificate of registration with the corresponding vehicle (in this case there may be a database shared between the administration for issuance of ownership certificates and the car manufacturers to provide information specific to each vehicle) etc.

According to a further feature of the authentication method, at least two authenticators of the type with bubbles may be associated on one same seal affixed to at least two physical elements, and the same call identifier then allows to verify all of the authenticators constituting the seal.

APPLICATIONS

According to the present invention, a multitude of industrial, logistic and domestic applications are possible: container or cargo seal with intermediate verifications upon customs clearance for example by verifying the authenticity of the seal recorded in the database and simultaneously accessing accurate information on the nature and the object of the cargo; measuring or metrology instrument seals verified by competent or State organizations; seals of computer-type electronic instruments or tachograph-type data recorders; seal of all types of meters (electricity, gas, water, all fluids etc); seals to prohibit access to buildings; seals of ballot boxes; seals of valuable objects or documents of the work of art type, certificates of authenticity, antiques, vehicle registration plates in relation to certificates of ownership (both of then hence becoming tamper-proof seals), seals of administrative documents such as national identity cards and passports.

The invention claimed is:

1. A method of verification of security of a system or site or the integrity of an object, the method comprising:

using a volumic authenticator, the volumic authenticator being the result of a chaotic process, wherein a representation of the volumic authenticator is stored in a database, wherein the volumic authenticator is a transparent volumic authenticator that contains a plurality of visible bubbles, said visible bubbles having a random size, a random number, a random shape, and at least one random arrangement of which the number, the shape and the arrangement are the result of the chaotic process;

associating said volumic authenticator to the system, site, or object by a physical connection, wherein any attempt to violate the system or site security or to violate the integrity of the object visibly modifies or destroys the volumic authenticator or the physical connection associating said volumic authenticator with the system, site, or object or both, wherein the physical connection associating the volumic authenticator with the system, site, or object is a wire integral with the volumic authenticator and the system, site, or object, wherein the wire is embedded in a permanent and irreversible manner into the volumic authenticator and said system, site, or object;

verifying the integrity of the physical connection and the volumic authenticator; and comparing the volumic authenticator to the representation stored in the database to determine that a violation of the system or site security or a violation of the integrity of the object has not occurred.

2. The method of claim 1, wherein the physical connection associating the volumic authenticator with the system, site, or object is a transparent resin joining the volumic authenticator and the system, site, or object.

3. The method of claim 1, further comprising an RFID partially or wholly inserted into the volumic authenticator.

4. The method of claim 1, wherein an image of the transparent volumic identifier is stored in a memory physically located within the system or the site for protection but of which the contents may be read from the outside.

5. The method of claim 3, wherein an image or the signature of the authenticator is stored in the memory of the RFID inserted into said authenticator.

6. The method of claim 4, wherein the image of the volumic authenticator is stored in a remote memory or database that may be consulted via a telecom network.

7. The method of claim 6, wherein verification of the integrity of the authenticator is made by visual comparison of the volumic authenticator with the image thereof stored either in a local database or in a remote database, or both simultaneously.

8. The method of claim 4, wherein verification of the integrity of the volumic authenticator is made by automatic comparison, using a suitable reader, with its digital representation stored in a local or remote database.

9. The method of claim 4, wherein an identifier is associated with the volumic authenticator corresponding to the address thereof in the database.

10. An authentication seal for proving security of a system, object or site comprising:

a volumic authenticator of which a representation is stored in a database, the volumic authenticator being the result of a chaotic process, wherein the volumic authenticator contains a plurality of visible bubbles, said visible bubbles having a random size, a random number, a random shape, and at least one random arrangement; and a physical connection between said volumic authenticator and said system, object or site, wherein any attempt to destroy or alter the physical connection is indicative of a security breach of the system, object or site, wherein the physical connection associating the volumic authenticator with the system, site, or object is a wire integrated into both the volumic authenticator and the system, site, or object, wherein the wire is embedded in a permanent and irreversible manner into the volumic authenticator and said system, site, or object, and wherein an intrusion in the system, object or site irreversibly alters the volumic authenticator or the physical connection or both the volumic authenticator and the physical connection.

11. The authentication seal of claim 10, wherein the physical connection comprises a wire with a first end and a second end, the first end integrated into the volumic authenticator.

12. The authentication seal of claim 11, wherein the second end of the wire is sandwiched between an upper sheet and a lower sheet, wherein the lower sheet features micro cuts.

13. The authentication seal of claim 10, wherein volumic authenticator is directly integrated into an irreversible single-unit cinch-up tie.

14. The authentication seal of claim 10, wherein volumic authenticator is directly integrated into a nameplate itself and the physical connection comprises a plurality of rivets and at least one blind rivet joining the nameplate with the volumic authenticator to the system, wherein the at least one blind rivet is accessible only from inside the system, object or site.

15. The authentication seal of claim 10, wherein the physical connection is integrated into said volumic authenticator by laminating said volumic authenticator between two protective sheets.

16. The authentication seal of claim 10, characterised in that the system comprises a primary package inside a secondary package, the secondary package having an opening, wherein the physical connection is a partially destructible adhesive label attached to the authenticator and both the secondary package and the primary package through the opening in the secondary package.

17. The authentication seal of claim 11, wherein the second end of the wire is threaded through an opening in the system, object or site and then permanently sandwiched between a first sheet and a second sheet, wherein the first sheet is transparent.

* * * * *